No. 869,340. PATENTED OCT. 29, 1907.
A. C. WALWORTH, Jr.
PIPE FITTING.
APPLICATION FILED NOV. 3, 1906.

Witnesses:
John H. Parker
Josephine E. Long

Inventor:
Arthur C. Walworth, Jr.
by Macleod, Calver, Copeland & Dike
Attorneys.

UNITED STATES PATENT OFFICE.

ARTHUR C. WALWORTH, JR., OF NEWTON, MASSACHUSETTS.

PIPE-FITTING.

No. 869,340.　　　　　Specification of Letters Patent.　　　　　Patented Oct. 29, 1907.

Application filed November 3, 1906. Serial No. 341,923.

*To all whom it may concern:*

Be it known that I, ARTHUR C. WALWORTH, Jr., a citizen of the United States, residing at Newton, county of Middlesex, and Commonwealth of Massachusetts, have invented a certain new and useful Improvement in Pipe-Fittings, of which the following is a specification, reference being had therein to the accompanying drawings.

My invention has for its object to produce a pipe fitting for use with pipes of large diameter which are to be subjected to high internal pressure, such as frequently occurs in hydraulic and steam engineering. Heretofore, fittings for this purpose have sometimes been made of cast steel, because this material furnishes the requisite strength, but great difficulty has been found with fittings made of this material on account of the difficulty and expense attendant on their production and also by reason of the fact that leakage due to blow holes frequently occurs. These blow holes also sometimes result in the giving way of the fittings, thus causing considerable expense or even danger. It is necessary in pipe fittings of this kind that they have sufficient strength to withstand the internal strain exerted by the fluid under pressure contained in them and also that they be absolutely tight so that no leakage may occur. The pipe fittings embodying my invention possess these two necessary qualities, and also weigh less than other fittings having equal strength.

The invention will be fully understood from the following specification taken in connection with the accompanying drawings, and the novel features thereof are pointed out and clearly defined in the claims at the close of the specification.

Figure 1:
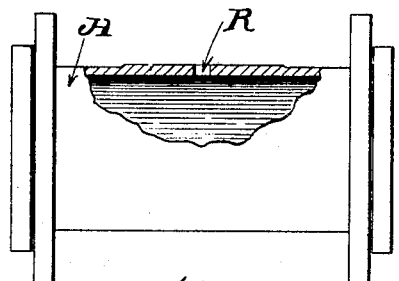
Figure 2:
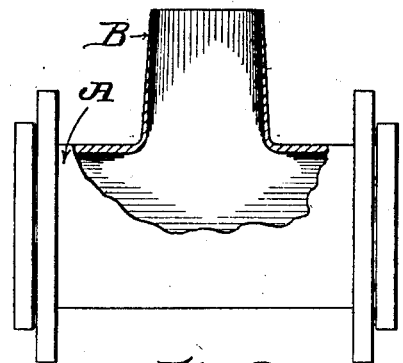
Figure 4:
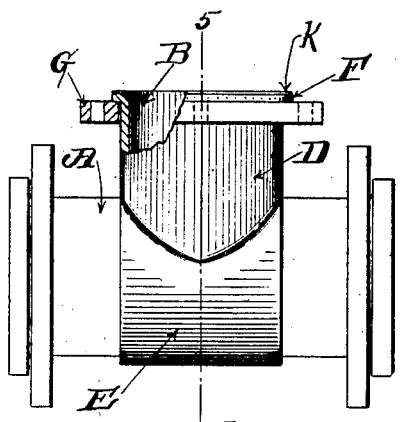
Figure 3:
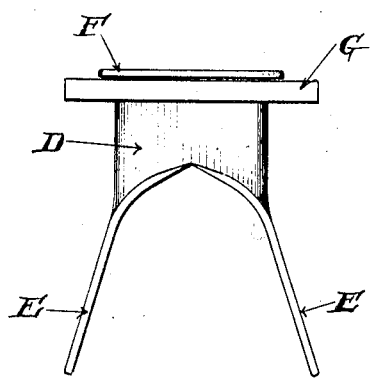
Figure 5:
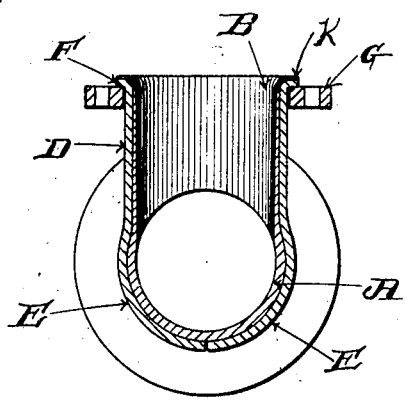

In the drawings,—Figure 1 is an elevation of a piece of pipe from which the body portion of the fitting is formed, the hole at the point where the branch is to be connected having been drilled. Fig. 2 shows the same section of pipe with the portion hereinafter termed the lining drawn up or formed from the metal surrounding the hole. Fig. 3 shows the saddle ready to be put in place upon the lining, the saddle being provided with a Van Stone flange and collar. Fig. 4 shows the completed fitting, the saddle being in place on the lining and the edges being welded down. Fig. 5 is a section on line 5—5, Fig. 4.

The body of the T is constructed of a suitable length of pipe A made of wrought iron or preferably of mild steel. At the point where the branch pipe is to be connected with the body of the T, a small hole R is drilled and the metal about this hole is drawn, spun or otherwise fashioned into the form desired to make a connection with the branch pipe. For convenience of description, I denominate this portion of metal B which is drawn up from the main body of the pipe the "lining". The walls of the lining B are necessarily thin, because the amount of metal afforded by the portion of the pipe surrounding the hole is not sufficient to form the lining of the same thickness as the remainder of the fitting. If increased strength for the lining is required, the portion of the pipe A about the hole R may be thickened to furnish an increased amount of metal from which to form the lining. This lining, being continuous with the main body of the fitting, insures the tightness of the fitting.

In order that the branch connection may when completed, have sufficient strength to withstand the strain imposed upon it by the fluid it contains, I place over the lining B a saddle D preferably also composed of steel or wrought iron in the same manner as the remainder of the fitting. This saddle D is preferably provided with downwardly extending side portions or flaps E—E, which surround the body of the fitting and are preferably joined to it by being welded about their edges. These flaps E—E preferably extend all the way around the body of the pipe, and cover the area thereof from which the metal forming the lining was taken. The upper edge of the lining B is also bent over the upper edge of the saddle D and the two edges may be united by welding. The edges of the flaps E may also be welded together and to the body of the pipe A. This welding is readily accomplished electrically.

On the upper edge of the saddle D there is preferably formed a flange F such as is found in the well-known Van Stone joint, and the upper surface of the portion of the lining B which is bent over the edge of the saddle D is ground to form a seat K (see Figs. 4 and 5) to insure a tight connection with the adjacent portion of the pipe to which the fitting is to be connected. A collar G preferably surrounds the saddle under the said flange, and is provided with bolt holes for the reception of bolts, not shown, by means of which the connection with the adjacent piece of pipe is made. If preferred for any reason, the saddle may be put in place upon the body of the fitting before the lining is formed, so that the saddle will act as a support for the lining during its formation. Any of the well-known methods of connecting the pipe fitting with the adjacent section of pipe may be employed in place of the collar and flange shown.

I am aware that pipe fittings have previously been made from two pieces of pipe which have been riveted together, but I believe myself to be the first to produce a pipe fitting in which the metal of the body portion of the fitting is drawn up to form a steam tight lining for the interior of the branch connection.

What I claim is:

1. The improved pipe fitting comprising a lining of metal integral with the body portion of the pipe fitting and a saddle surrounding the said lining.

2. The improved pipe fitting comprising a lining of drawn metal integral with the body portion of the pipe fitting and a saddle about the said lining and welded at its edges thereto.

3. The improved pipe fitting comprising a lining of drawn metal integral with the body portion of the pipe fitting and a saddle about the said lining, the upper edges of the said lining and saddle being welded together.

4. The improved pipe fitting comprising a lining of drawn metal integral with the body portion of the pipe fitting and provided with a seat on the upper edge of the said lining, and a saddle about the said lining.

5. The improved pipe fitting comprising a lining of drawn metal integral with the body portion of the pipe fitting, a saddle about the said lining, a flange on the upper end of the said saddle, and a collar about the said saddle.

In testimony whereof I affix my signature, in presence of two witnesses.

ARTHUR C. WALWORTH, Jr.

Witnesses:
GEORGE P. DIKE,
ALICE H. MORRISON.